(12) United States Patent
Li et al.

(10) Patent No.: US 11,404,015 B2
(45) Date of Patent: Aug. 2, 2022

(54) DISPLAY DEVICE AND MEDICAL DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Shou Li, Beijing (CN); Jian Zhang, Beijing (CN); Zhanchang Bu, Beijing (CN); Bo Li, Beijing (CN); Luqiang Guo, Beijing (CN); Zhiming Meng, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/342,453

(22) Filed: Jun. 8, 2021

(65) Prior Publication Data
US 2022/0172687 A1    Jun. 2, 2022

(30) Foreign Application Priority Data

Nov. 30, 2020 (CN) .......................... 202011384137.3

(51) Int. Cl.
*G09G 3/36* (2006.01)
*G09G 5/10* (2006.01)

(52) U.S. Cl.
CPC .............. *G09G 3/3607* (2013.01); *G09G 5/10* (2013.01); *G09G 2360/141* (2013.01); *G09G 2360/144* (2013.01); *G09G 2380/08* (2013.01)

(58) Field of Classification Search
CPC .. G09G 3/3607; G09G 5/10; G09G 2360/141; G09G 2360/144; G09G 2380/08
See application file for complete search history.

(56) References Cited

U.S. PATENT DOCUMENTS

| | | | |
|---|---|---|---|
| 11,079,877 B1 * | 8/2021 | Hung | G06F 3/0418 |
| 2010/0165002 A1 * | 7/2010 | Ahn | G09G 3/3648 |
| | | | 345/102 |
| 2014/0300536 A1 * | 10/2014 | Kim | H04N 13/383 |
| | | | 345/156 |

(Continued)

FOREIGN PATENT DOCUMENTS

| | | | |
|---|---|---|---|
| CN | 109859720 A * | 6/2019 | G09G 5/10 |

*Primary Examiner* — Antonio Xavier
(74) *Attorney, Agent, or Firm* — McCoy Russell LLP (57) ABSTRACT

A display device includes a light control panel and a liquid crystal display panel laminated one on another. The liquid crystal display panel includes one or more first photosensitive thin film transistor for detecting an environmental brightness value of the display device. Each first photosensitive thin film transistor includes a control electrode, an input end and an output end, the liquid crystal display panel includes a plurality of first shift register units, the control electrode of each first photosensitive thin film transistor is coupled to a clock signal line of each first shift register unit, the input end of each first photosensitive thin film transistor is coupled to a deflection reference voltage signal line of the liquid crystal display panel, and the output end of each first photosensitive thin film transistor is coupled to a first output signal line of the liquid crystal display panel.

20 Claims, 4 Drawing Sheets

(56) References Cited

U.S. PATENT DOCUMENTS

2015/0370124 A1* 12/2015 Han .................. G02F 1/133514
   349/12
2017/0184888 A1* 6/2017 Sakamoto ......... G02F 1/133308
2020/0320956 A1* 10/2020 Liu ....................... G09G 3/2092

* cited by examiner

DISPLAY DEVICE AND MEDICAL DEVICE

CROSS-REFERENCE TO RELATED APPLICATION

The present application claims priority to Chinese Patent Application No. 202011384137.3 filed on Nov. 30, 2020. The entire contents of the above-listed application is hereby incorporated by reference for all purposes.

TECHNICAL FIELD

The present disclosure relates to the field of display technology, in particular to a display device and a medical device.

BACKGROUND

Usually, in order to improve a degree of accuracy of a displayed image, a medical device needs to be provided with a light sensor to collect an environmental brightness value and compensate for a display result in accordance with the environmental brightness value. In the related art, usually an add-on light sensor is used to collect the environmental brightness value. However, a device cost and a device volume may increase, and the use thereof is inconvenient.

SUMMARY

In one aspect, the present disclosure provides in some embodiments a display device, including a light control panel and a liquid crystal display panel laminated one on another. The liquid crystal display panel is provided with one or more first photosensitive thin film transistor for detecting an environmental brightness value of the display device. Each first photosensitive thin film transistor includes a control electrode, an input end and an output end, the liquid crystal display panel includes a plurality of first shift register units, the control electrode of each first photosensitive thin film transistor in the one or more first photosensitive thin film transistors is coupled to a clock signal line of each first shift register unit, the input end of each first photosensitive thin film transistor in the one or more first photosensitive thin film transistors is coupled to a deflection reference voltage signal line of the liquid crystal display panel, and the output end of each first photosensitive thin film transistor in the one or more first photosensitive thin film transistors is coupled to a first output signal line of the liquid crystal display panel.

In some possible embodiments of the present disclosure, one or more second photosensitive thin film transistors are arranged at a light-entering side of the light control panel, each second photosensitive thin film transistor includes a control electrode, an input end and an output end, the light control panel includes a plurality of second shift register units, the control electrode of each second photosensitive thin film transistor in the one or more second photosensitive thin film transistors is coupled to a clock signal line of each second shift register unit, the input end of each second photosensitive thin film transistor in the one or more second photosensitive thin film transistors is coupled to a deflection reference voltage signal line of the light control panel, and the output end of each second photosensitive thin film transistor in the one or more second photosensitive thin film transistors is coupled to a second output signal line of the liquid crystal display panel.

In some possible embodiments of the present disclosure, a first signal multiplexer is arranged between the input end of each first photosensitive thin film transistor in the one or more first photosensitive thin film transistors and the deflection reference voltage signal line of the liquid crystal display panel, and a second signal multiplexer is arranged between the input end of each second photosensitive thin film transistor in the one or more second photosensitive thin film transistors and the deflection reference voltage signal line of the light control panel.

In some possible embodiments of the present disclosure, each first shift register unit is coupled to a plurality of first photosensitive thin film transistors, the plurality of first photosensitive thin film transistors coupled to a same first shift register unit is connected in parallel to each other, each second shift register unit is coupled to a plurality of second photosensitive thin film transistors, and the plurality of second photosensitive thin film transistors coupled to a same second shift register unit is connected in parallel to each other.

In some possible embodiments of the present disclosure, the liquid crystal display panel includes a color film substrate and a first array substrate arranged opposite to each other to form a cell, the first array substrate is arranged at a light-entering side of the liquid crystal display panel, the color film substrate is provided with a first black matrix, a first opening is formed in the first black matrix, the one or more first photosensitive thin film transistors are arranged on the first array substrate, and an orthogonal projection of the first opening onto the first array substrate overlaps an orthogonal projection of a corresponding first photosensitive thin film transistor in the one or more first photosensitive thin film transistor onto the first array substrate.

In some possible embodiments of the present disclosure, an inner wall of the first opening is subjected to whitening treatment.

In some possible embodiments of the present disclosure, the display device further includes a backlight unit arranged at a side of the light control panel away from the liquid crystal display substrate, a sealant for securing the light control panel is arranged between the backlight unit and the light control panel, a second opening is formed in the sealant, and an orthogonal projection of the second opening onto a second array substrate overlaps an orthogonal projection of a corresponding second photosensitive thin film transistor in the one or more second photosensitive thin film transistors onto the second array substrate.

In some possible embodiments of the present disclosure, the light control panel includes an opposite substrate and the second array substrate, the opposite substrate is arranged at a light-exiting side of the light control panel, the second array substrate is arranged at the light-entering side of the light control panel, a second black matrix is arranged on the opposite substrate, the one or more second photosensitive thin film transistors are arranged on the second array substrate, and an orthogonal projection of a corresponding second photosensitive thin film transistor in the one or more second photosensitive thin film transistors onto the opposite substrate is located within an orthogonal projection of the second black matrix onto the opposite substrate.

In some possible embodiments of the present disclosure, the display device further includes a backlight unit arranged at a side of the light control panel away from the liquid crystal display panel and a support structure for securing the light control panel and the backlight unit, and an orthogonal projection of a region of the support structure in contact with the light control panel onto the light control panel does not overlap an orthogonal projection of a corresponding second photosensitive thin film transistor in the one or more second photosensitive thin film transistor onto the light control panel.

In some possible embodiments of the present disclosure, the liquid crystal display panel includes a display region and a first peripheral region surrounding the display region, the first photosensitive thin film transistors are arranged at the first peripheral region, the light control panel includes a light control region corresponding to the display region and a second peripheral region surrounding the light control region, an orthogonal projection of the display region onto the light control panel overlaps the light control region, and the one or more second photosensitive thin film transistors are arranged at the second peripheral region.

In another aspect, the present disclosure provides in some embodiments a medical device including a display device. The display device includes a light control panel and a liquid crystal display panel laminated one on another. The liquid crystal display panel is provided with one or more first photosensitive thin film transistor for detecting an environmental brightness value of the display device. Each first photosensitive thin film transistor includes a control electrode, an input end and an output end, the liquid crystal display panel includes a plurality of first shift register units, the control electrode of each first photosensitive thin film transistor in the one or more first photosensitive thin film transistors is coupled to a clock signal line of each first shift register unit, the input end of each first photosensitive thin film transistor in the one or more first photosensitive thin film transistors is coupled to a deflection reference voltage signal line of the liquid crystal display panel, and the output end of each first photosensitive thin film transistor in the one or more first photosensitive thin film transistors is coupled to a first output signal line of the liquid crystal display panel.

In some possible embodiments of the present disclosure, one or more second photosensitive thin film transistors are arranged at a light-entering side of the light control panel, each second photosensitive thin film transistor includes a control electrode, an input end and an output end, the light control panel includes a plurality of second shift register units, the control electrode of each second photosensitive thin film transistor in the one or more second photosensitive thin film transistors is coupled to a clock signal line of each second shift register unit, the input end of each second photosensitive thin film transistor in the one or more second photosensitive thin film transistors is coupled to a deflection reference voltage signal line of the light control panel, and the output end of each second photosensitive thin film transistor in the one or more second photosensitive thin film transistors is coupled to a second output signal line of the liquid crystal display panel.

In some possible embodiments of the present disclosure, a first signal multiplexer is arranged between the input end of each first photosensitive thin film transistor in the one or more first photosensitive thin film transistors and the deflection reference voltage signal line of the liquid crystal display panel, and a second signal multiplexer is arranged between the input end of each second photosensitive thin film transistor in the one or more second photosensitive thin film transistors and the deflection reference voltage signal line of the light control panel.

In some possible embodiments of the present disclosure, each first shift register unit is coupled to a plurality of first photosensitive thin film transistors, the plurality of first photosensitive thin film transistors coupled to a same first shift register unit is connected in parallel to each other, each second shift register unit is coupled to a plurality of second photosensitive thin film transistors, and the plurality of second photosensitive thin film transistors coupled to a same second shift register unit is connected in parallel to each other.

In some possible embodiments of the present disclosure, the liquid crystal display panel includes a color film substrate and a first array substrate arranged opposite to each other to form a cell, the first array substrate is arranged at a light-entering side of the liquid crystal display panel, the color film substrate is provided with a first black matrix, a first opening is formed in the first black matrix, the one or more first photosensitive thin film transistors are arranged on the first array substrate, and an orthogonal projection of the first opening onto the first array substrate overlaps an orthogonal projection of a corresponding first photosensitive thin film transistor in the one or more first photosensitive thin film transistor onto the first array substrate.

In some possible embodiments of the present disclosure, an inner wall of the first opening is subjected to whitening treatment.

In some possible embodiments of the present disclosure, the display device further includes a backlight unit arranged at a side of the light control panel away from the liquid crystal display substrate, a sealant for securing the light control panel is arranged between the backlight unit and the light control panel, a second opening is formed in the sealant, and an orthogonal projection of the second opening onto a second array substrate overlaps an orthogonal projection of a corresponding second photosensitive thin film transistor in the one or more second photosensitive thin film transistors onto the second array substrate.

In some possible embodiments of the present disclosure, the light control panel includes an opposite substrate and the second array substrate, the opposite substrate is arranged at a light-exiting side of the light control panel, the second array substrate is arranged at the light-entering side of the light control panel, a second black matrix is arranged on the opposite substrate, the one or more second photosensitive thin film transistors are arranged on the second array substrate, and an orthogonal projection of a corresponding second photosensitive thin film transistor in the one or more second photosensitive thin film transistors onto the opposite substrate is located within an orthogonal projection of the second black matrix onto the opposite substrate.

In some possible embodiments of the present disclosure, the display device further includes a backlight unit arranged at a side of the light control panel away from the liquid crystal display panel and a support structure for securing the light control panel and the backlight unit, and an orthogonal projection of a region of the support structure in contact with the light control panel onto the light control panel does not overlap an orthogonal projection of a corresponding second photosensitive thin film transistor in the one or more second photosensitive thin film transistor onto the light control panel.

In some possible embodiments of the present disclosure, the liquid crystal display panel includes a display region and a first peripheral region surrounding the display region, the first photosensitive thin film transistors are arranged at the first peripheral region, the light control panel includes a light control region corresponding to the display region and a second peripheral region surrounding the light control region, an orthogonal projection of the display region onto the light control panel overlaps the light control region, and the one or more second photosensitive thin film transistors are arranged at the second peripheral region.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
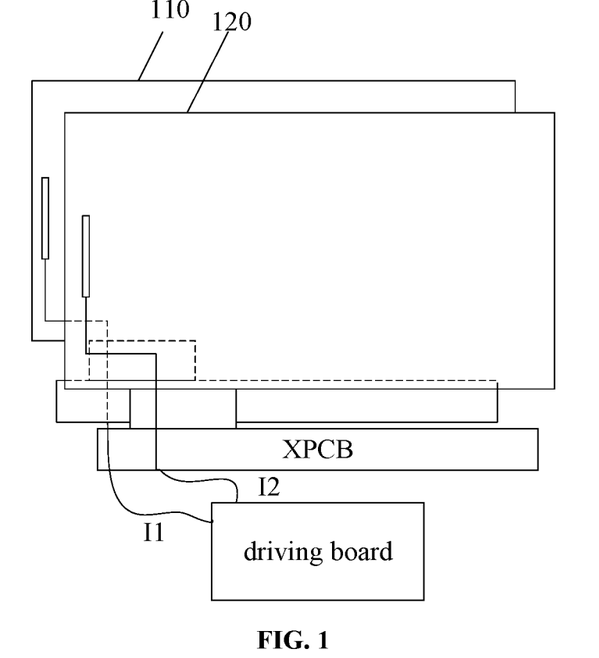
FIG. 1 is a structural schematic view showing a display device according to some embodiments of the present disclosure.
Figure 2:
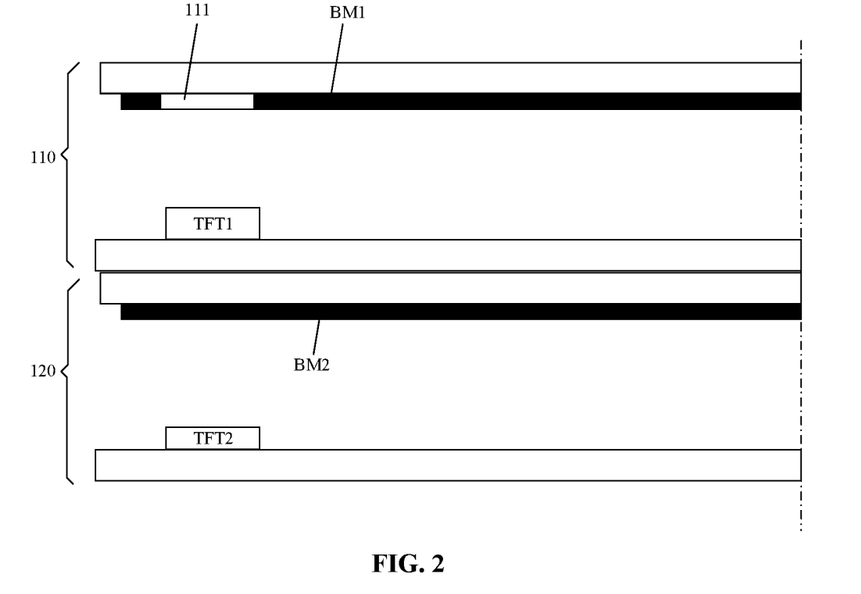
FIG. 2 is another structural schematic view showing the display device according to some embodiments of the present disclosure.
Figure 3:
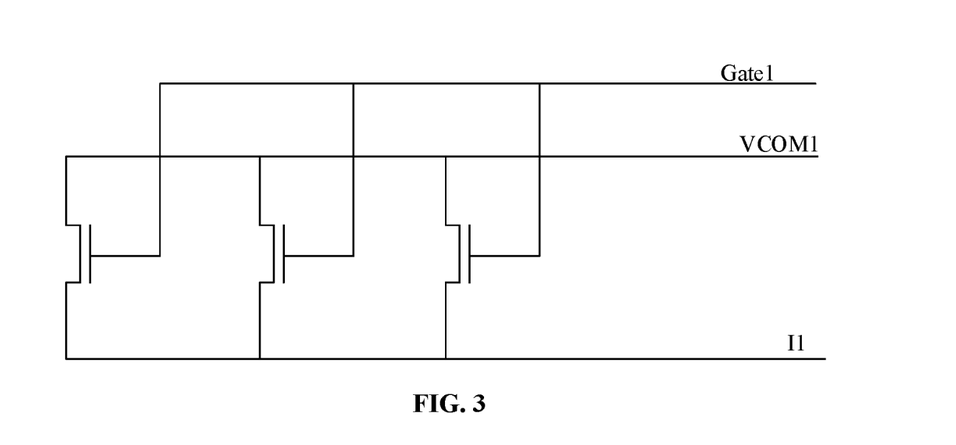
FIG. 3 is yet another structural schematic view showing the display device according to some embodiments of the present disclosure.

As shown in FIG. 1 and FIG. 2, the present disclosure provides in some embodiments a display device which includes, e.g., a liquid crystal display panel 110 and a light control panel 120. The liquid crystal display panel 110 is arranged at a light-exiting side of the light control panel 120.

To be specific, in the embodiments of the present disclosure, the liquid crystal display panel 110 may include an array substrate, a color film substrate and a liquid crystal cell. The liquid crystal display panel 110 may be used to achieve a display function, and it may include a plurality of pixels. Each pixel may include a plurality of subpixels in different colors. The structure of the liquid crystal display panel 110 may refer to that known in the art to some extent, and thus will not be particularly defined herein.

The light control panel 120 may also be called as Mono panel, and different from the liquid crystal display panel 110, the light control panel 120 may be understood as a liquid crystal display panel without any color filter. The light control panel 120 may include a plurality of light control pixels, and each light control pixel may include a plurality of light control subpixels for controlling the passage of light.

The control subpixel has an optimal effect to allow the light to pass therethrough and block the light, so it is able to improve contrast of the display device as well as a display effect. In addition, a state of each light control subpixel where the light is allowed to pass may be controllable.

In some possible embodiments of the present disclosure, the light control subpixels may correspond to subpixels of the liquid crystal display panel 110 respectively, so as to accurately control display brightness of each subpixel of the liquid crystal display panel 110, thereby to further improve the display effect.

In some special cases, the display effect of the display device is highly demanded. For example, in the medical field, for a same medical image, a same viewing effect should be acquired on different medical devices, so as to ensure an accurate diagnosis.

As shown in FIG. 2, the liquid crystal display panel 110 is provided with one or more first photosensitive thin film transistors TFT1 for detecting brightness value of an external environment where the display device is located.

It should be appreciated that, an electrical property of a semiconductor may be affected by a light intensity, so it is able to detect the light intensity through detecting an electrical parameter of a thin film transistor.

As shown in FIGS. 2, 3, 4A and 4B, in the embodiments of the present disclosure, each first photosensitive thin film transistor TFT1 includes a control electrode, a first electrode and a second electrode. In the embodiments of the present disclosure, the first electrode of the first photosensitive thin film transistor TFT1 may serve as an input end of the first photosensitive thin film transistor TFT1, and the second electrode of the first photosensitive thin film transistor TFT1 may serve as an output end of the first photosensitive thin film transistor TFT1. The control electrode of the first photosensitive thin film transistor TFT1 may be a gate electrode, one of the first electrode and the second electrode of the first photosensitive thin film transistor TFT1 may be a source electrode, and the other may be a drain electrode.

As shown in FIGS. 2, 3, 4A and 4B, the liquid crystal display panel 110 includes a plurality of first shift register units GOA1 The control electrode of each first photosensitive thin film transistor TFT1 is coupled to a clock signal line CLK1 of the first shift register unit GOA1 to acquire a control signal Gate1. The input end of each first photosensitive thin film transistor TFT1 is coupled to a deflection reference voltage signal line VCOM1 of the liquid crystal display panel 110 to acquire an inputted reference signal. The output end of each first photosensitive thin film transistor TFT1 is coupled to a first output signal line of the liquid crystal display panel 110 to output an environmental brightness signal I1.

Figure 4A:
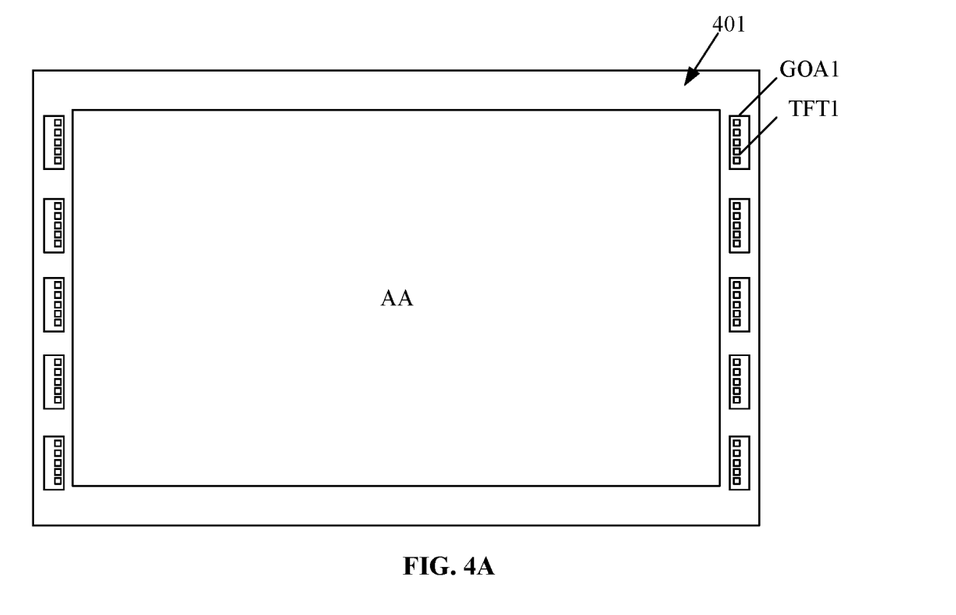
FIG. 4A is still yet another structural schematic view showing the display device according to some embodiments of the present disclosure.

As shown in FIG. 4A, in the embodiments of the present disclosure, each first photosensitive thin film transistor TFT1 may be arranged at a region where the first shift register units GOA1 are located, so as to reduce space occupation.

In some embodiments of the present disclosure, a first signal multiplexer MUX may be arranged between the input end of the first photosensitive thin film transistor TFT1 and the deflection reference voltage signal line VCOM1 of the liquid crystal display panel 110, so as to enable the first photosensitive thin film transistor TFT1 to acquire a reference signal from the deflection reference voltage signal line VCOM1 of the liquid crystal display panel 110 through the first signal multiplexer.

In the embodiments of the present disclosure, apart from the additional first output signal line, it is unnecessary to provide the liquid crystal display panel 110 with any additional signal lines, and it is also unnecessary to provide a related driving circuit for providing a control signal and an input signal for the first photosensitive thin film transistor TFT1, so it is able to simplify a structure and a circuit design of the display panel.

During the implementation, a lookup table may be established between brightness values and current flowing through the first photosensitive thin film transistor TFT1, and brightness data may be looked up in the lookup table. Further, a correspondence between brightness and a dimming table may be looked up and output to a control circuit or controller, so as to adjust backlight brightness. In the embodiments of the present disclosure, the display effect may be compensated through an existing or improved compensation algorithm selected in accordance with the environmental brightness value, and the compensation algorithm will not be particularly defined herein.

According to the embodiments of the present disclosure, the environmental brightness value may be detected through the first photosensitive thin film transistors TFT1 on the display liquid crystal panel 110 without any add-on light collection device, so it is able to reduce the device cost, and reduce a space occupied by an add-on light sensor disadvantageously.

Further, through the reuse of the deflection reference voltage signal line and the clock signal line of the liquid crystal display panel 110, it is able to reduce the quantity of lines, thereby to reduce a design complexity of the display panel and improve the reliability of the display device.

For example, in some embodiments of the present disclosure, one or more second photosensitive thin film transistors TFT2 may be arranged at a light-entering side of the light control panel 120.

In the embodiments of the present disclosure, the one or more second photosensitive thin film transistors TFT2 may also be arranged at the light-entering side of the light control panel 120 to collect the backlight brightness of the display device. A connection mode of the second photosensitive thin film transistor TFT2 may be similar to that of the first photosensitive thin film transistor TFT1 on the liquid crystal display panel 110.

To be specific, each second photosensitive thin film transistor TFT2 may include a control electrode, a first electrode and a second electrode. The first electrode of the second photosensitive thin film transistor TFT2 may serve as an input end of the second photosensitive thin film transistor TFT2, and the second electrode of the second photosensitive thin film transistor TFT2 may serve as an output end of the second photosensitive thin film transistor TFT2. The control electrode of the second photosensitive thin film transistor TFT2 may be a gate electrode, one of the first electrode and the second electrode of the second photosensitive thin film transistor TFT2 may be a source electrode, and the other may be a drain electrode.

The light control panel 120 may include a plurality of second shift register units GOA2. The control electrode of each second photosensitive thin film transistor TFT2 may be coupled to a clock signal line CLK2 of the second shift register unit GOA2, the input end of each second photosensitive thin film transistor TFT2 may be coupled to a deflection reference voltage signal line VCOM2 of the light control panel 120, and the output end of each second photosensitive thin film transistor TFT2 may be coupled to a second output signal line of the liquid crystal display panel 110, so as to output a backlight brightness signal 12.

As shown in FIG. 1, the first output signal line and the second output signal line may each extend along edges of the liquid crystal display panel 110 and the light control panel 120 to a corresponding circuit board XPCB, and then may be coupled to a driving board. A voltage conversion and amplification circuit may be integrated with the XPCB, and Digital Imaging and Communications in Medicine (DICOM) compensation processor and the driving board Field-Programmable Gate Array (FPGA) may be used in common, so as to reduce the cost.

In some embodiments of the present disclosure, a second signal multiplexer may be arranged between the input end of the second photosensitive thin film transistor TFT2 and the deflection reference voltage signal line VCOM2 of the light control panel 120, so as to acquire a reference signal from the deflection reference voltage signal line VCOM2 of the light control panel 120.

In use, the first photosensitive thin film transistor TFT1 may be used to collect the environmental brightness value, and the second photosensitive thin film transistor TFT2 may be used to collect a backlight brightness value. Next, a display result of the display device may be compensated in accordance with the collected environmental brightness value and the backlight brightness value, so as to improve the compensation accuracy and further improve the display effect.

In a medical field, the transmission and storage of an image needs to meet a standard DICOM format, and meanwhile a grayscale image needs to be displayed by the display device in accordance with a grayscale standard display function. Hence, a professional medical display device needs to perform DICOM compensation. In the embodiments of the present disclosure, the DICOM compensation may be performed on the display device in accordance with the environmental brightness value and the backlight brightness value.

For example, In some possible embodiments of the present disclosure, the brightness of the display device may be compensation through the following equation $J(L)=A+B\log_{10} L+C(\log_{10} L)^2+D(\log_{10} L)^3+E(\log_{10} L)^4+F(\log_{10} L)^5+G(\log_{10} L)^6+H(\log_{10} L)^7+I(\log_{10} L)^8$ . . . (1), where L represents the detected environmental brightness value, A, B, C, D, E, F, G, H and I represent compensation coefficients and are constant values, and J(L) represents a brightness compensation result.

In some embodiments of the present disclosure, in order to improve the collection accuracy of the environmental brightness value and the backlight brightness value, the plurality of photosensitive thin film transistors may be provided.

As shown in FIG. 4A, in some embodiments of the present disclosure, each first shift register unit GOA1 may be coupled to a plurality of first photosensitive thin film transistors TFT1, and the plurality of first photosensitive thin film transistors TFT1 coupled to a same first shift register unit GOA1 may be connected in parallel to each other.

Figure 4B:
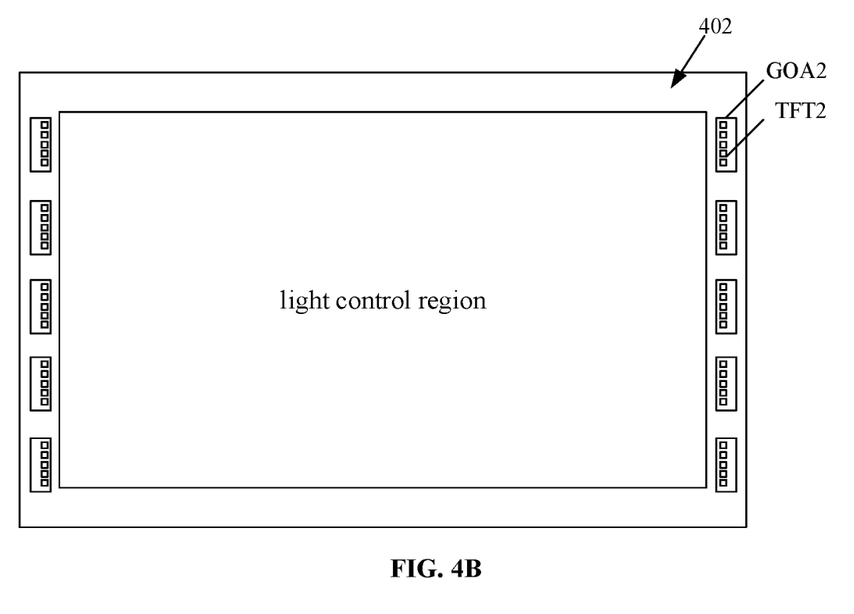
FIG. 4B is still yet another structural schematic view showing the display device according to some embodiments of the present disclosure.

As shown in FIG. 4B, each second shift register unit GOA2 may be coupled to a plurality of second photosensitive thin film transistors TFT2, and the plurality of second photosensitive thin film transistors TFT2 coupled to a same second shift register unit GOA2 may be connected in parallel to each other.

The following description will be given when each first shift register unit GOA1 corresponds to 5 first photosensitive thin film transistors TFT1 and each second shift register unit GOA2 corresponds to 5 second photosensitive thin film transistors TFT2. After testing, a display device with a diagonal size of 23.8 inches may be provided with 800 to 900 first photosensitive thin film transistors TFT1 and 800 to 900 second photosensitive thin film transistors TFT2, so it is able to collect sufficient data. In addition, it is able to provide a relatively large signal anti-interference capability, thereby to improve the collection accuracy of the environmental brightness value and the backlight brightness value.

In some embodiments of the present disclosure, the liquid crystal display panel 110 may include a color filter substrate and a first array substrate.

As shown in FIG. 2, in the embodiments of the present disclosure, a first black matrix is arranged on the color filter substrate, first openings 111 are formed in the first black matrix, the first photosensitive thin film transistors TFT1 are arranged on the first array substrate, and the first openings 111 are arranged in such a manner as to correspond to the first photosensitive thin film transistors TFT1 respectively.

An orthogonal projection of each first opening 111 onto the first array substrate may overlap the corresponding first photosensitive thin film transistor TFT1. It should be appreciated that, the word "overlap" refers to that a part of or all of the orthogonal projection of the first opening 111 onto the first array substrate overlaps a part of or all of an orthogonal projection of the corresponding first photosensitive thin film transistor TFT1 onto the first array substrate. In other words, the orthogonal projection of the first opening 111 onto the first array substrate may overlap the orthogonal projection of the corresponding first photosensitive thin film transistor TFT1 onto the first array substrate, or the orthogonal projection of the first opening 111 onto the first array substrate may be located within the orthogonal projection of the corresponding first photosensitive thin film transistor TFT1 onto the first array substrate, or a part of the orthogonal projection of the first opening 111 onto the first array substrate may overlap a part of the orthogonal projection of the corresponding first photosensitive thin film transistor TFT1 onto the first array substrate, or the orthogonal projection of the first opening 111 onto the first array substrate may coincide with the orthogonal projection of the corresponding first photosensitive thin film transistor TFT1 onto the first array substrate.

Through the first openings 111 in the first black matrix, light from an external environment may pass through the first opening 111 to the corresponding first photosensitive thin film transistor TFT1, so as to detect an environmental brightness value.

In some embodiments of the present disclosure, an inner wall of the first opening 111 may be subjected to whitening treatment, so as to reduce the light absorbed by the inner wall of the first opening 111, thereby to further improve the detection accuracy of the environmental brightness value.

In some embodiments of the present disclosure, as shown in FIG. 4A, the liquid crystal display panel 110 includes a display region AA, and each first photosensitive thin film transistor TFT1 is arranged outside the display region AA. In addition, as shown in FIG. 4B, the light control panel 120 includes a light control region corresponding to the display region AA, an orthogonal projection of the display region AA onto the light control panel 120 overlaps the light control region, and each second photosensitive thin film transistor TFT2 is arranged outside the light control region.

It should be appreciated that, as shown in FIG. 4A, the liquid crystal display panel 110 includes the display region AA and a first peripheral region 401 surrounding the display region AA, and each first shift register unit GOA1 is arranged at the first peripheral region 401. In addition, as shown in FIG. 4B, the light control panel 120 includes the light control region and a second peripheral region 402 surrounding the light control region. As shown in FIGS. 4A and 4B, each first shift register unit GOA1 is arranged at the first peripheral region 401, and each second shift register unit GOA2 is arranged at the second peripheral region 402.

The liquid crystal display panel 110 may be driven from a single side, i.e., the first shift register units GOA1 may be arranged merely at one side of the display region AA, or the liquid crystal display panel 110 may be driven from two sides, i.e., the first shift register units GOA1 may be arranged at two sides of the display region AA. Similarly, the light control panel 120 may be driven from a single side, i.e., the second shift register units GOA2 may be arranged merely at one side of the light control region, or the light control panel 120 may be driven from two sides, i.e., the second shift register units GOA2 may be arranged at two sides of the light control region.

In the embodiments of the present disclosure, the first photosensitive thin film transistor TFT1 may be arranged outside the display region AA, and the second photosensitive thin film transistor TFT2 may be arranged outside the light control region, so as to prevent the display effect from being adversely affected, e.g., due to possible coupling between a line for the photosensitive thin film transistor and the other structures.

Figure 5:
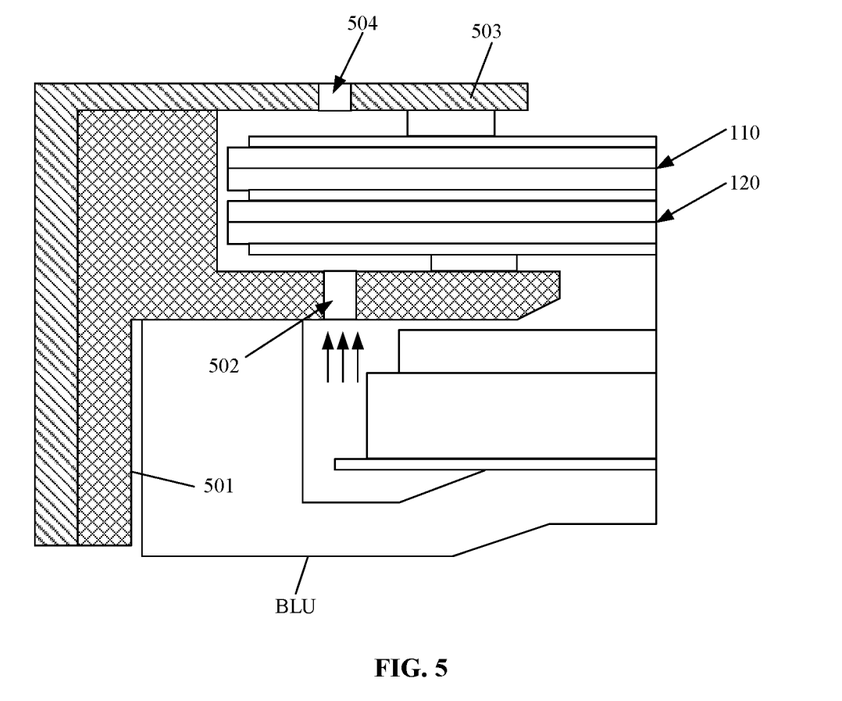
FIG. 5 is still yet another structural schematic view showing the display device according to some embodiments of the present disclosure.

As shown in FIG. 5, in some embodiments of the present disclosure, the display device further includes a backlight unit BLU arranged at a side of the light control panel 120 away from the liquid crystal display panel 110, and a sealant 501 for securing the light control panel 120 is further arranged between the backlight unit BLU and the light control panel 120. In the embodiments of the present disclosure, the sealant 501 is used to support and secure the light control panel 120 and the liquid crystal display panel 110. In order to prevent the display effect from being adversely affected, a portion of the sealant 501 overlapping the light control panel 120 may be arranged outside the light control region, i.e., at the second peripheral region 402 in FIG. 4B. Second openings 502 are formed in the sealant 501, and are arranged in such a manner as to correspond to the second photosensitive thin film transistors TFT2 respectively.

An orthogonal projection of each second opening 502 onto a second array substrate may overlap the corresponding second photosensitive thin film transistor TFT2. It should be appreciated that, the word "overlap" refers to that a part of or all of the orthogonal projection of the second opening 502 onto the second array substrate overlaps a part of or all of the orthogonal projection of the corresponding second photosensitive thin film transistor TFT1 onto the second array substrate.

Through the second opening 502 in the sealant 501, it is able to ensure that the light from the backlight unit BLU to reach the corresponding second photosensitive thin film transistor TFT2, thereby to collect the backlight brightness value.

It should be appreciated that, in the embodiments of the present disclosure, a region of an outer frame 503 of the display device corresponding to the first photosensitive thin film transistors TFT1 may be hollowed out according to the practical need, so as to form a hollowed-out region 504, thereby to effectively collect the environmental brightness value through the first photosensitive thin film transistors TFT1.

Figure 6:
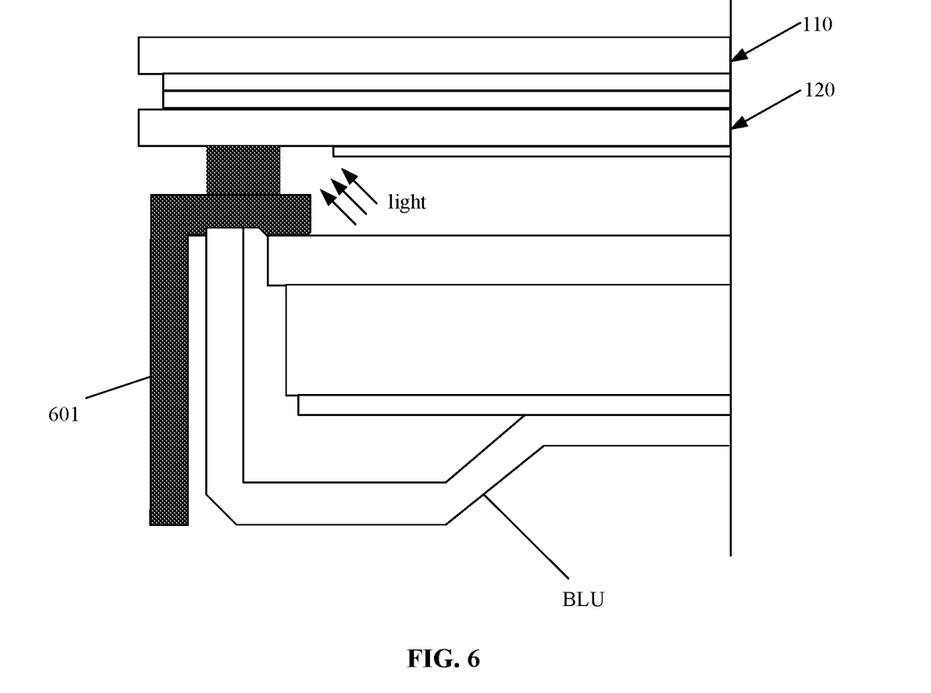
FIG. 6 is still yet another structural schematic view showing the display device according to some embodiments of the present disclosure.

As shown in FIG. 6, in some possible embodiments of the present disclosure, the display device may be bezel-free or have a narrow bezel, i.e., the sealant 501 in FIG. 5 may be removed. Correspondingly, the display device may further include a support structure 601 for securing the light control panel 120 and the backlight unit BLU. An orthogonal projection of a portion of the support structure 601 in contact with the light control panel 120 onto the light control panel 120 may not overlap the second photosensitive thin film transistor TFT2, i.e., the light from the backlight unit BLU may reach the second photosensitive thin film transistor TFT2.

As shown in FIG. 2, in the embodiments of the present disclosure, a position of each first photosensitive thin film transistor TFT1 on the first array substrate may be the same as a position of each second photosensitive thin film transistor TFT2 on the second array substrate, i.e., the first array substrate and the second array substrate may be of a same structure. In other words, the first array substrate may be reused as the second array substrate. In this way, merely one kind of array substrate needs to be adopted in the embodiments of the present disclosure, so as to reduce the manufacture cost.

Figure 7:
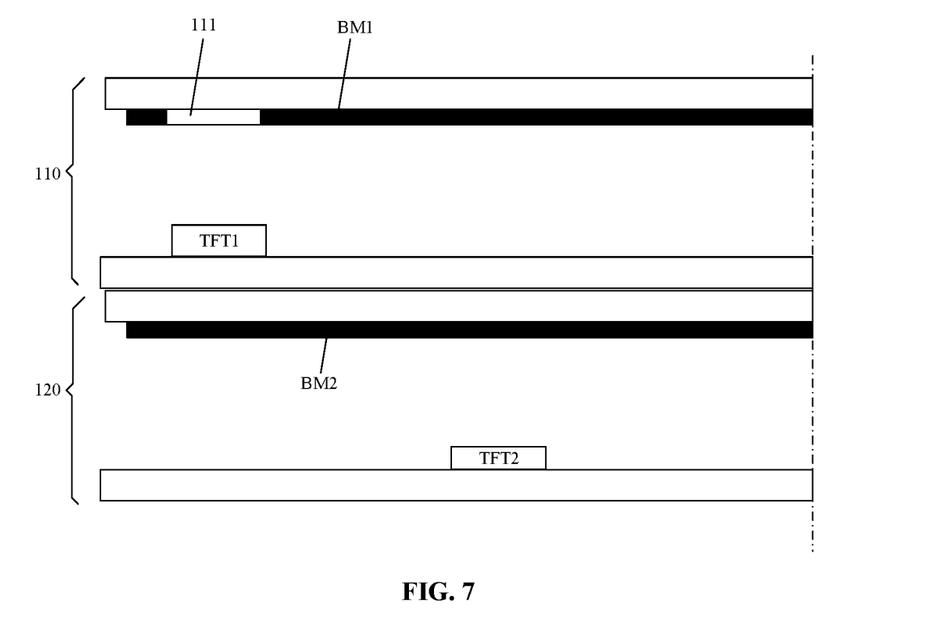
FIG. 7 is a schematic view showing a connection relationship of first photosensitive thin film transistors according to some embodiments of the present disclosure.

In some other embodiments of the present disclosure, as shown in FIG. 6, in order to be adapted to a position of the support structure 601, a position of each second photosensitive thin film transistor TFT2 is adjusted. As shown in FIG. 7, the position of each first photosensitive thin film transistor TFT1 on the first array substrate may be different from the position of each second photosensitive thin film transistor TFT2 on the second array substrate.

In the embodiments of the present disclosure, each second photosensitive thin film transistor TFT2 may be arranged at a region between the support structure 601 and the light control region, so as to collect the backlight brightness value through the second photosensitive thin film transistor TFT2, and reduce a bezel width of the display device, thereby to improve the user experience.

In some embodiments of the present disclosure, the light control panel 120 may include an opposite substrate and the second array substrate, and the opposite substrate differs from the above-mentioned color film substrate mainly in that no color filter is provided.

As shown in FIG. 7, a second black matrix is arranged on the opposite substrate, the second photosensitive thin film transistor TFT2 is arranged on the second array substrate, and an orthogonal projection of the second photosensitive thin film transistor TFT2 onto the opposite substrate is located within the second black matrix BM2.

When the orthogonal projection of the second photosensitive thin film transistor TFT2 onto the opposite substrate is located within the second black matrix BM2, it is able to block the light from the external environment, and prevent the light from the external environment from reaching the second photosensitive thin film transistor TFT2, thereby to improve the detection accuracy of the backlight brightness value.

The present disclosure further provides in some embodiments a medical device including the above-mentioned display device.

The medical device in the embodiments of the present disclosure may include all technical schemes about the display device mentioned hereinabove, so it is able for the medical device to achieve all of or a part of the above-mentioned technical effects, which will thus not be particularly defined herein.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. A display device, comprising a light control panel and a liquid crystal display panel laminated one on another, wherein the liquid crystal display panel is provided with one or more first photosensitive thin film transistor for detecting an environmental brightness value of the display device; and
each first photosensitive thin film transistor comprises a control electrode, an input end and an output end, the liquid crystal display panel comprises a plurality of first shift register units, the control electrode of each first photosensitive thin film transistor in the one or more first photosensitive thin film transistors is coupled to a clock signal line of each first shift register unit, the input end of each first photosensitive thin film transistor in the one or more first photosensitive thin film transistors is coupled to a deflection reference voltage signal line of the liquid crystal display panel, and the output end of each first photosensitive thin film transistor in the one or more first photosensitive thin film transistors is coupled to a first output signal line of the liquid crystal display panel.

2. The display device according to claim 1, wherein one or more second photosensitive thin film transistors are arranged at a light-entering side of the light control panel, each second photosensitive thin film transistor comprises a control electrode, an input end and an output end, the light control panel comprises a plurality of second shift register units, the control electrode of each second photosensitive thin film transistor in the one or more second photosensitive thin film transistors is coupled to a clock signal line of each second shift register unit, the input end of each second photosensitive thin film transistor in the one or more second photosensitive thin film transistors is coupled to a deflection reference voltage signal line of the light control panel, and the output end of each second photosensitive thin film transistor in the one or more second photosensitive thin film transistors is coupled to a second output signal line of the liquid crystal display panel.

3. The display device according to claim 2, wherein a first signal multiplexer is arranged between the input end of each first photosensitive thin film transistor in the one or more first photosensitive thin film transistors and the deflection reference voltage signal line of the liquid crystal display panel, and a second signal multiplexer is arranged between the input end of each second photosensitive thin film transistor in the one or more second photosensitive thin film transistors and the deflection reference voltage signal line of the light control panel.

4. The display device according to claim 2, wherein each first shift register unit is coupled to a plurality of first photosensitive thin film transistors, the plurality of first photosensitive thin film transistors coupled to a same first shift register unit is connected in parallel to each other, each second shift register unit is coupled to a plurality of second photosensitive thin film transistors, and the plurality of second photosensitive thin film transistors coupled to a same second shift register unit is connected in parallel to each other.

5. The display device according to claim 1, wherein the liquid crystal display panel comprises a color film substrate and a first array substrate arranged opposite to each other to form a cell, the first array substrate is arranged at a light-entering side of the liquid crystal display panel, the color film substrate is provided with a first black matrix, a first opening is formed in the first black matrix, the one or more first photosensitive thin film transistors are arranged on the first array substrate, and an orthogonal projection of the first opening onto the first array substrate overlaps an orthogonal projection of a corresponding first photosensitive thin film transistor in the one or more first photosensitive thin film transistor onto the first array substrate.

6. The display device according to claim 5, wherein an inner wall of the first opening is subjected to whitening treatment.

7. The display device according to claim 1, further comprising a backlight unit arranged at a side of the light control panel away from the liquid crystal display substrate, wherein a sealant for securing the light control panel is arranged between the backlight unit and the light control panel, a second opening is formed in the sealant, and an orthogonal projection of the second opening onto a second array substrate overlaps an orthogonal projection of a corresponding second photosensitive thin film transistor in the one or more second photosensitive thin film transistors onto the second array substrate.

8. The display device according to claim 7, wherein the light control panel comprises an opposite substrate and the second array substrate, the opposite substrate is arranged at a light-exiting side of the light control panel, the second array substrate is arranged at the light-entering side of the light control panel, a second black matrix is arranged on the opposite substrate, the one or more second photosensitive thin film transistors are arranged on the second array substrate, and an orthogonal projection of a corresponding second photosensitive thin film transistor in the one or more second photosensitive thin film transistors onto the opposite substrate is located within an orthogonal projection of the second black matrix onto the opposite substrate.

9. The display device according to claim 1, further comprising a backlight unit arranged at a side of the light control panel away from the liquid crystal display panel and a support structure for securing the light control panel and the backlight unit, wherein an orthogonal projection of a region of the support structure in contact with the light control panel onto the light control panel does not overlap an orthogonal projection of a corresponding second photosensitive thin film transistor in the one or more second photosensitive thin film transistor onto the light control panel.

10. The display device according to claim 1, wherein the liquid crystal display panel comprises a display region and a first peripheral region surrounding the display region, the first photosensitive thin film transistors are arranged at the first peripheral region, the light control panel comprises a light control region corresponding to the display region and a second peripheral region surrounding the light control region, an orthogonal projection of the display region onto the light control panel overlaps the light control region, and the one or more second photosensitive thin film transistors are arranged at the second peripheral region.

11. A medical device, comprising a display device, wherein the display device comprises a light control panel and a liquid crystal display panel laminated one on another, and the liquid crystal display panel is provided with one or more first photosensitive thin film transistor for detecting an environmental brightness value of the display device; and
each first photosensitive thin film transistor comprises a control electrode, an input end and an output end, the liquid crystal display panel comprises a plurality of first shift register units, the control electrode of each first photosensitive thin film transistor in the one or more first photosensitive thin film transistors is coupled to a clock signal line of each first shift register unit, the input end of each first photosensitive thin film transistor in the one or more first photosensitive thin film transistors is coupled to a deflection reference voltage signal line of the liquid crystal display panel, and the output end of each first photosensitive thin film transistor in the one or more first photosensitive thin film transistors is coupled to a first output signal line of the liquid crystal display panel.

12. The medical device according to claim 11, wherein one or more second photosensitive thin film transistors are arranged at a light-entering side of the light control panel, each second photosensitive thin film transistor comprises a control electrode, an input end and an output end, the light control panel comprises a plurality of second shift register units, the control electrode of each second photosensitive thin film transistor in the one or more second photosensitive thin film transistors is coupled to a clock signal line of each second shift register unit, the input end of each second photosensitive thin film transistor in the one or more second photosensitive thin film transistors is coupled to a deflection reference voltage signal line of the light control panel, and the output end of each second photosensitive thin film transistor in the one or more second photosensitive thin film transistors is coupled to a second output signal line of the liquid crystal display panel.

13. The medical device according to claim 12, wherein a first signal multiplexer is arranged between the input end of each first photosensitive thin film transistor in the one or more first photosensitive thin film transistors and the deflection reference voltage signal line of the liquid crystal display panel, and a second signal multiplexer is arranged between the input end of each second photosensitive thin film transistor in the one or more second photosensitive thin film transistors and the deflection reference voltage signal line of the light control panel.

14. The medical device according to claim 12, wherein each first shift register unit is coupled to a plurality of first photosensitive thin film transistors, the plurality of first photosensitive thin film transistors coupled to a same first shift register unit is connected in parallel to each other, each second shift register unit is coupled to a plurality of second photosensitive thin film transistors, and the plurality of second photosensitive thin film transistors coupled to a same second shift register unit is connected in parallel to each other.

15. The medical device according to claim 11, wherein the liquid crystal display panel comprises a color film substrate and a first array substrate arranged opposite to each other to form a cell, the first array substrate is arranged at a light-entering side of the liquid crystal display panel, the color film substrate is provided with a first black matrix, a first opening is formed in the first black matrix, the one or more first photosensitive thin film transistors are arranged on the first array substrate, and an orthogonal projection of the first opening onto the first array substrate overlaps an orthogonal projection of a corresponding first photosensitive thin film transistor in the one or more first photosensitive thin film transistor onto the first array substrate.

16. The medical device according to claim 15, wherein an inner wall of the first opening is subjected to whitening treatment.

17. The medical device according to claim 11, wherein the display device further comprises a back light unit arranged at a side of the light control panel away from the liquid crystal display substrate, a sealant for securing the light control panel is arranged between the back light unit and the light control panel, a second opening is formed in the sealant, and an orthogonal projection of the second opening onto a second array substrate overlaps an orthogonal projection of a corresponding second photosensitive thin film transistor in the one or more second photosensitive thin film transistors onto the second array substrate.

18. The medical device according to claim 17, wherein the light control panel comprises an opposite substrate and the second array substrate, the opposite substrate is arranged at a light-exiting side of the light control panel, the second array substrate is arranged at the light-entering side of the light control panel, a second black matrix is arranged on the opposite substrate, the one or more second photosensitive thin film transistors are arranged on the second array substrate, and an orthogonal projection of a corresponding second photosensitive thin film transistor in the one or more second photosensitive thin film transistors onto the opposite substrate is located within an orthogonal projection of the second black matrix onto the opposite substrate.

19. The medical device according to claim 11, wherein the display device further comprises a back light unit arranged at a side of the light control panel away from the liquid crystal display panel and a support structure for securing the light control panel and the back light unit, and an orthogonal projection of a region of the support structure in contact with the light control panel onto the light control panel does not overlap an orthogonal projection of a corresponding second photosensitive thin film transistor in the one or more second photosensitive thin film transistors onto the light control panel.

20. The medical device according to claim 11, wherein the liquid crystal display panel comprises a display region and a first peripheral region surrounding the display region, the first photosensitive thin film transistors are arranged at the first peripheral region, the light control panel comprises a light control region corresponding to the display region and a second peripheral region surrounding the light control region, an orthogonal projection of the display region onto the light control panel overlaps the light control region, and the one or more second photosensitive thin film transistors are arranged at the second peripheral region.

* * * * *